United States Patent Office 3,297,457
Patented Jan. 10, 1967

3,297,457
BASIC REFRACTORY BRICKS
Fedia R. Charvat, Williamsville, N.Y., assignor to Union Carbide Corporation, a corporation of New York
No Drawing. Filed Nov. 7, 1961, Ser. No. 150,653
2 Claims. (Cl. 106—59)

The present invention relates to the manufacture of basic refractory bricks. More particularly, the present invention relates to an improved process for producing refractory brick from fused grains of magnesia-chrome ore refractory material.

Refractory brick formed from magnesia-chrome ore refractory material have previously been manufactured by casing from a fused mixture of chrome ore and magnesia in accordance with known techniques as disclosed in "Steel Plant Refractories," United Steel Companies Ltd., Sheffield, England, 1959. The proportion of chrome ore to magnesia in the cast bricks generally ranges from about 3:7 to about 7:3, depending upon the particular properties desired in the product refractory bricks. While cast refractory bricks possess certain advantageous characteristics which make them suitable for use in open-hearth type steel-making furnaces, it has been found that the thermal shock, and other characteristics thereof are not entirely satisfactory.

A different type of brick was therefore developed to avoid certain undesirable features of the cast magnesia-chrome ore refractory brick. This latter type brick is manufactured by fusing magnesia and chrome ore and subsequently solidifying and crushing the mixture to obtain separate fine and coarse fractions of basic refractory material. The fractions are then blended in accordance with known techniques and bonded in shapes suitable for use in the construction of open-hearth steel-making furnaces and other types of industrial furnaces. The blending and sizing of the fractions is most often conducted in a manner such as disclosed in U.S. Patent 2,068,411 to Heuer. The bonding of the fractions can be accomplished by various suitable conventional techniques, e.g. by sintering, or with chemical binders such as magnesium sulfate.

Although this fused grain type of basic refractory brick possesses advantages over the cast brick, as regards ease of manufacture and thermal shock, it has been found that considerable deterioration, i.e. spalling, of these bricks occurs during extended operation in open hearth type steel-making furnaces. This deterioration during operation is believed to be due primarily to internal disruptive forces generated interior the brick, primary in the fine fraction of fused grain material, which cause progressive and rapid disruption of the bond in the fine fraction with consequent destruction of the brick. It is further believed that the internal disruptive forces result from a volume change in the fused grain material which is caused by the cyclic oxidation and reduction of the iron (as oxide) contained in the fine fraction as the furnace temperature varies periodically between about 1350° C. and 1600° C. The iron in the fine fraction which causes the above-described undesirable effects is present as oxidic compounds which are derived from the chrome ore employed in the production of the magnesia-chrome ore basic refractory material. The rapid and excessive disruption of the bond in the fine fraction, and the relative absence of this type of deterioration in the coarse fraction, is attributable to the much greater specific surface area of the particles of the fine fraction.

In view of the fact that fused grain bricks formed of fine and coarse fractions of magnesia-chrome ore refractory material possess substantial industrial utility, it would constitute a significant contribution to the art if this type of refractory brick could be provided with increased resistance to spalling.

It is therefore an object of the present invention to provide an improved process for the manufacture of fused grain, magnesia-chrome ore refractory bricks whereby refractory bricks are produced which are resistant to deterioration due to internal disruptive forces.

It is another object of the present invention to provide a fused grain, magnesia-chrome oxide basic refractory brick which is substantially free from deterioration due to internal disruptive forces.

Other objects will be apparent from the following description and claims.

The manufacture of fused grain, magnesia-chrome ore refractory bricks at the present time is generally accomplished by preparing fine and coarse fractions of magnesia-chrome ore refractory material, blending the fine and coarse fractions to ensure a predetermined strength in the final brick product, and bonding the blended materials in a form suitable for use as a refractory brick in open hearth steel-making furnaces.

The present invention is an improvement in the above described process which comprises providing a fine fraction of magnesia-chrome ore refractory material having an iron impurity content which is less than about 3 percent and which is substantially less than the iron content of the coarse fraction.

The fused grain, magnesia-chrome ore refractory bricks provided by the improved process of the present invention are characterized by being resistant to deterioration or spalling due to internal disruptive forces.

In the manufacture of fused grain, magnesia-chrome ore basic refractory bricks by conventional techniques a finely-divided mixture of chrome ore and magnesia is heated to provide a fused mixture which is subsequently solidified, crushed, separated into fine and coarse fractions and blended in accordance with techniques such as described in the aforementioned Heuer patent. The blended mixture is sintered or otherwise agglomerated in the form of bricks suitable for use in open-hearth steel-making furnaces, the chrome ore which is admixed with the magnesia being previously treated, for example by known chlorination techniques, to reduce the iron oxide content thereof to a value considered to tbe acceptable to avoid undesired deterioration in the brick ultimately to be produced. For example, if the deterioration due to internal disruptive forces were to be substantially avoided, the entire quantity of ore would be treated so that the magnesia-ore mixture would contain less than about 3 percent iron as oxide. As can be readily understood, this removal of iron from the ore imposes a significant economic penalty on the process.

In the practice of the present invention however, this economic burden can be substantially reduced while at the same time providing a fused grain basic refractory brick which is resistant to spalling.

This benefit is achieved in one embodiment of the present invention by initially separating the iron impurity bearing material, i.e. chrome ore, into separate portions. Certain of these portions of the chrome ore are used only in the preparation of the fine fraction of magnesia-chrome ore refractory material while the other portions are used only for the preparation of the coarse fractions. The portions of chrome ore designated for use in the preparation of the fine fraction are treated substantially as previously described, i.e. by chlorination or other techniques to reduce the iron impurity level below a value which will provide less than about 3 percent iron as oxide in the mixture of chrome ore with magnesia. After the thus purified ore is mixed with the desired amount of magnesia, the mixture is fused, solidified and ground to provide the fine fraction of magnesia-chrome oxide refractory material containing less than about 3 percent oxidic iron material.

The portions of the ore designated for use in the production of the coarse fraction are not iron-purified to the same extent since the coarse fraction is not significantly effected by the internal forces which cause deterioration of the fine fraction. Accordingly, the chrome ore which is to be used in the production of the coarse fraction is only purified of iron to the extent that the desired degree of resistance to external corrosive forces will be achieved in the coarse fraction of the brick. In most instances the iron impurity in the ore is reduced to a level which will provide between about 6 percent and about 15 percent oxidic iron material in the ore-magnesia mixture from which the coarse fraction is prepared.

When the ore for use in the production of the coarse fraction has been provided with a satisfactory iron impurity level, it is mixed with magnesia, fused, and particulated to between 8 and 65 mesh. The coarse fraction is then blended in accordance with known techniques with the iron-purified fine fraction which is formed of particles of less than 65 mesh. The blended mixture is then bonded, for example, by sintering or by chemical techniques, to provide refractory agglomerates for use in open hearth furnace construction.

The following example is provided to illustrate the present invention.

*Example I*

Fine and coarse fractions having the following composition were prepared from fused magnesia-chrome ore refractory material:

| | Percent |
|---|---|
| $Cr_2O_3$ | 23.66 |
| FeO | 13.36 |
| CaO | 0.60 |
| MgO | 50.85 |
| $Al_2O_3$ | 8.46 |
| $SiO_2$ | 1.00 |

A first fused grain sintered brick was prepared by standard techniques from the fine and coarse fractions.

A second fused grain sintered brick was prepared by the same standard technique using the above-described coarse fraction and a different fine fraction containing approximately equal amounts of MgO and $Cr_2O_3$ and less than 3 percent iron in accordance with the present invention.

Both bricks were subjected to 27 temperature cycles in a gas-fired furnace; the temperature variation in each cycle was from about 1400° C. to 1700° C. After completion of the temperature cycling the bricks were examined.

The second brick which was prepared in accordance with the present invention showed no evidence of cracking or deterioration. The other brick contained numerous surface cracks and exhibited a substantial degree of deterioration.

In a further embodiment of the present invention, high grade, i.e. low iron-content, chrome ore is used for producing the fine fraction and less expensive low grade, high iron-content, chrome ore is used in preparing the coarse fraction. Iron purification is accomplished as previously described to produce the above specified iron impurity levels in the fine and coarse fractions. In this embodiment of the invention, a substantial portion of the expense involved in purification and handling of the chrome ore can be eliminated.

From the above description it can be seen that the improved process of the present invention provides a fused grain, magnesia-chrome ore refractory brick which is resistant to corrosion from internal disruptive forces while at the same time the expense involved in purifying the chrome ore of iron impurities is substantially reduced.

In the present disclosure the expression "chrome ore" refers to chrome ore containing oxidic iron material and having $Cr_2O_3$ as the predominant constituent.

Additionally, in order to ensure satisfactory refractory properties in addition to spalling resistance, in the bricks ultimately produced, the silica content of the ore is required to be less than about 5 percent and preferably less than about 2 percent.

The fine fraction which is referred to herein consists of particles less than 65 mesh and the coarse fraction consists of particles between 8 and 65 mesh. The mesh size designations are Tyler Series.

What is claimed is:

1. A basic refractory brick consisting essentially of bonded agglomerate of particles of magnesia-chrome ore refractory material, said chrome ore having a silica content of less than 5% and said particles consisting of a coarse fraction formed of particles between 8 and 65 mesh and a fine fraction formed of particles of less than 65 mesh, the iron oxide content of the fine fraction being less than 3% and the iron oxide content of the coarse fraction being between 6 and 15%.

2. A basic refractory brick consisting essentially of a sintered agglomerate of particles of magnesia-chrome ore refractory material, said chrome ore having a silica content of less than 5% and said particles consisting of a coarse fraction formed of particles between 8 and 65 mesh and a fine fraction formed of particles of less than 65 mesh, the iron oxide content of the fine fraction being less than 3% and the iron oxide content of the coarse fraction being between 6 and 15%.

References Cited by the Examiner

UNITED STATES PATENTS 2,636,827   4/1953   Lanser et al. _____ 106—59

FOREIGN PATENTS 724,980   2/1955   Great Britain.

TOBIAS E. LEVOW, *Primary Examiner.*

JOHN H. MACK, *Examiner.*

J. E. POER, *Assistant Examiner.*